L. F. GOODSPEED.
SPEED GEAR MECHANISM.
APPLICATION FILED AUG. 7, 1909.
1,019,454.
Patented Mar. 5, 1912.
2 SHEETS—SHEET 1.
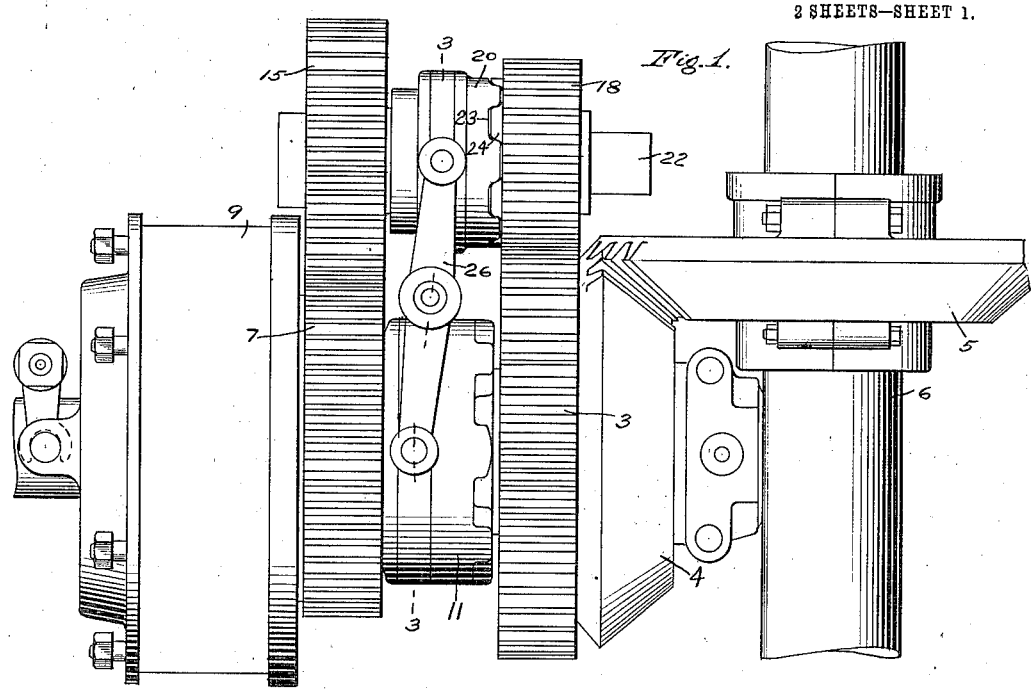
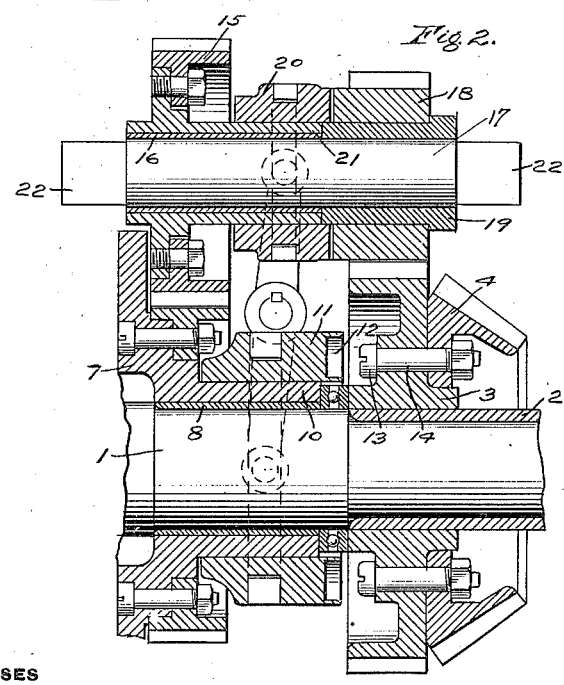
WITNESSES
Wm. M. Cady
J. S. Custer
INVENTOR
Leland F. Goodspeed
by E. Wright
Att'y.

L. F. GOODSPEED.
SPEED GEAR MECHANISM.
APPLICATION FILED AUG. 7, 1909.
1,019,454.
Patented Mar. 5, 1912.
2 SHEETS—SHEET 2.
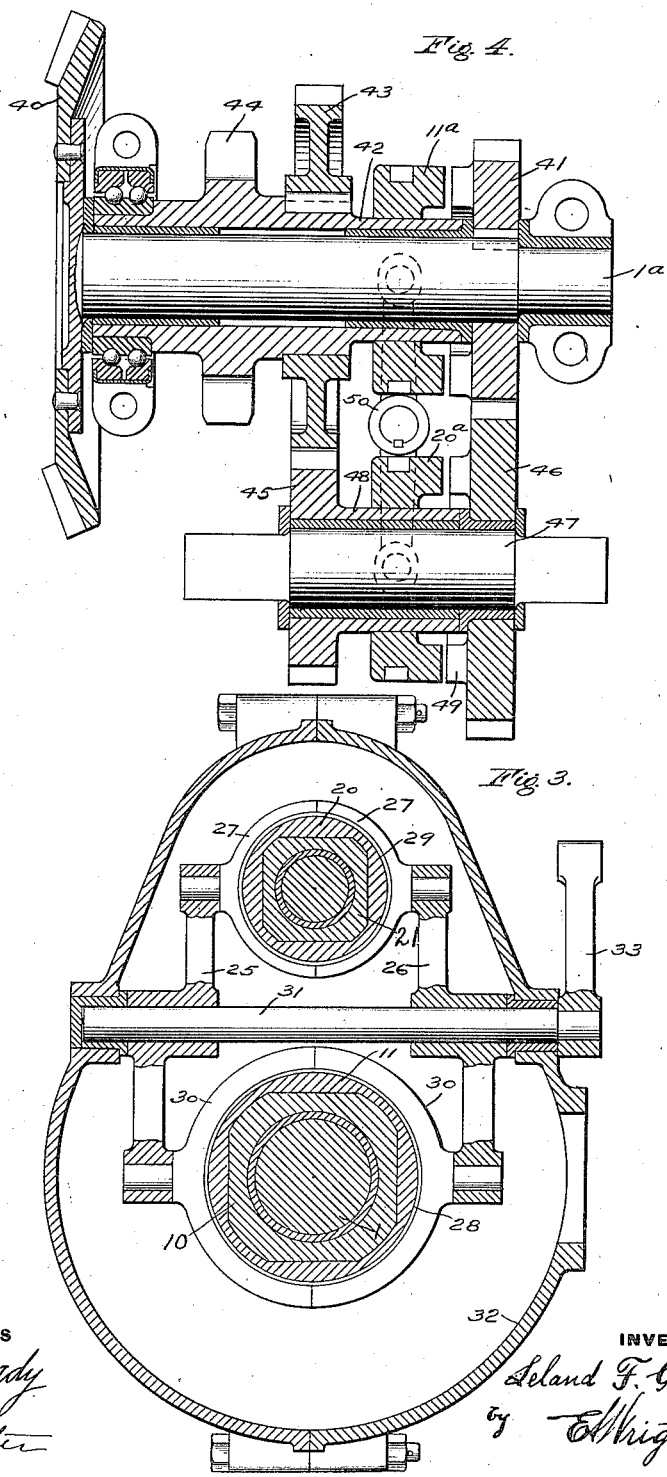
WITNESSES
Wm. M. Cady
J. S. Custer
INVENTOR
Leland F. Goodspeed
by E. Wright
Att'y.

UNITED STATES PATENT OFFICE.

LELAND F. GOODSPEED, OF MILWAUKEE, WISCONSIN, ASSIGNOR TO THE WESTING-HOUSE AIR BRAKE COMPANY, OF PITTSBURGH, PENNSYLVANIA, A CORPORATION OF PENNSYLVANIA.

SPEED-GEAR MECHANISM.

1,019,454.   Specification of Letters Patent.   Patented Mar. 5, 1912.

Original application filed March 2, 1908, Serial No. 418,732. Divided and this application filed August 7, 1909. Serial No. 511,790.

*To all whom it may concern:*

Be it known that I, LELAND F. GOODSPEED, a citizen of the United States, residing at Milwaukee, in the county of Milwaukee and State of Wisconsin, have invented new and useful Improvements in Speed-Gear Mechanism, of which the following is a specification.

This invention relates to change or variable speed transmission gearing, more particularly for self-propelled vehicles, the present application being a division of my prior application, Serial No. 418732, filed March 2, 1908.

One object of my invention is to provide an improved change speed gear mechanism having the gears constantly in mesh to obviate the danger of stripping the gear teeth in shifting from one speed to another.

Another object of my invention is to provide an improved change speed gear mechanism having clutch devices for connecting up to produce different speeds and means for throwing out one clutch device upon throwing in the other, thereby rendering it impossible to cut in two speed mechanisms at the same time.

Another object of my invention is to provide a compact, substantially constructed, and positive acting variable speed gear mechanism.

In the accompanying drawings Figure 1 is a top plan view of a variable or change speed gear mechanism embodying my invention; Fig. 2 a horizontal sectional view of the above gear mechanism with parts broken away; Fig. 3 a vertical section taken substantially on the line 3—3 of Fig. 1; and Fig. 4 a horizontal sectional view of another form of change speed gear mechanism embodying my invention.

As shown in Figs. 1 to 3, a main motor shaft 1 is provided upon which is journaled, preferably through the intermediary of a bushing 2, a gear 3 having secured thereto a bevel gear 4 meshing with bevel gear 5 on shaft 6. A second gear 7, also journaled on the shaft 1 through the intermediary of a bushing 8 is connected to a main clutch 9 of suitable construction adapted to control the connection of the main shaft 1 to the gear 7. Upon a substantially squared sleeve portion 10 of the gear 7 is slidably mounted a clutch member 11 having recesses 12 adapted to engage corresponding projections on the gear 3, such as the heads 13 of the bolts 14 employed to secure the bevel gear 4 to the gear 3.

Meshing with gear 7 is a gear 15 journaled through a bushing 16 upon a stationary stub shaft 17 having squared ends 22, mounted in suitable bearings, and meshing with gear 3 is a gear 18 also journaled on stub shaft 17 through a bushing 19. A clutch member 20 is slidably mounted on a squared sleeve portion 21 of the gear 15 and is provided with recesses 23 adapted to engage with corresponding projections or teeth 24 secured to the gear 18.

For operating the clutch members 11 and 20 rocker arms 25 and 26 are employed, as more clearly shown in Fig. 3, having journaled in their opposite ends split rings 27 and 30. These rings are mounted in grooves 28 and 29 in clutch members 11 and 20 respectively. The rocker arms 25 and 26 are secured to an operating shaft 31, which may be journaled in casing 32 inclosing the gear mechanism.

On one end of the shaft 31, outside of the casing 32 is secured an arm 33 adapted to be connected to a suitable manually operated means for rocking the arm. By this means only one of the clutch members can be thrown in at a time, as the movement to throw in one clutch member throws out the other clutch member, as will be evident.

In operation, the gear 7, sleeve 10 and clutch member 11 rotate continually with main shaft 1 whenever the main clutch 9 is thrown in, and for one speed the clutch member 11 may be thrown in. The gear 3 and bevel gear 4 are then directly connected to the power motor, and power is transmitted through the bevel gear 5 to the axle 6. To change the speed, the arm 33 is operated to throw out the clutch member 11 and throw in the clutch member 20, the position of the parts being then as shown in Fig. 2 and gear 7, which is continually in mesh with gear 15 drives the gear 18 through the clutch member 20, which continually rotates with gear 15. Gear 18 then rotates gear 3 and thereby the bevel gears 4 and 5 and the axle 6.

It will now be seen that as all the gears are continually in mesh danger of stripping out gear teeth is eliminated, and as one clutch member is always thrown out when the other is thrown in, it is impossible to throw in different speed gears at the same time. The ratio of the gears 7, 15, 18, and 3 is preferably such, that the lower speed is produced when power is transmitted through the gears, while the higher speed is obtained by the more direct connection through the clutch member 11 and gear 3.

The construction described so far, and shown in Figs. 1, 2, and 3 of the drawings, is designed more especially for a rail motor car. In Fig. 4 a construction is shown, adapted more particularly for an automobile. In this construction, the main shaft $1^a$ is driven from a bevel gear 40 having oppositely disposed bevel pinions meshing therewith to operate the main shaft $1^a$ in either direction of rotation as desired. Gear 41 is keyed to the main shaft $1^a$, and clutch member $11^a$, mounted on a squared portion of sleeve 42 is adapted to engage with projections on the gear 41. The sleeve 42 has secured thereto a gear 43 and a sprocket wheel 44, the latter being connected by a sprocket chain to the automobile axle, in the usual manner. Gears 45 and 46 meshing respectively with gears 43 and 41 journaled on a stationary stub shaft 47. Clutch member $20^a$ is slidably mounted on a squared sleeve extension 48 of the gear 45 and is adapted to engage projections 49 on the gear 46. The clutch members are operated by rocker arms, similar to those shown in Fig. 3, one marked 50 being shown in Fig. 4.

The operation is substantially the same as that of the construction shown in Figs. 1, 2, and 3, and when the clutch $11^a$ is thrown in, power is transmitted from the shaft $1^a$ through gear 41, clutch member $11^a$, and sleeve 42 directly to the sprocket wheel 44. Upon disengaging clutch member $11^a$ and throwing in clutch member $20^a$ power is transmitted from shaft $1^a$ through gears 41 and 46, clutch member $20^a$, sleeve 48, and gears 45 and 43 to the sprocket wheel 44.

It will be noted that with a construction of the above described character, the different sets of speed gears run continually at their respective speeds, when the motor is running, thus doing away with the usual action of the ordinary speed gear mechanism of either entirely disconnecting the low speed gear or of running same at an excessive speed upon connecting up the high speed gear; one speed gear, however, being always cut out of active operation when the other is cut in, by the operation of the clutch mechanism.

Having now described my invention, what I claim as new and desire to secure by Letters Patent, is:—

1. In a variable speed gear mechanism, the combination with a driving shaft, of a stationary shaft, a gear mounted on and adapted to be rotated with the driving shaft, a gear mounted and free to rotate on the stationary shaft and meshing with the gear on the driving shaft, a second gear adapted to freely rotate on the stationary shaft, a gear on the driving shaft meshing with said second gear, and means for operatively connecting the gears on the stationary shaft.

2. In a variable speed gear mechanism, the combination with a driving shaft, of a stationary shaft, a pair of meshing gears carried by and adapted to freely rotate on the respective shafts, a second pair of meshing gears also carried by said shafts and adapted to freely rotate thereon, means for operatively connecting one of said gears to the driving shaft, and a clutch for connecting the gears on the stationary shaft.

3. In a variable speed gear mechanism, the combination with a driving shaft, of a stationary shaft, a gear carried by and adapted to be rotated with the driving shaft, a square sleeve on said gear, a clutch member mounted to slide longitudinally on said sleeve, a gear mounted to freely rotate on the stationary shaft and meshing with the gear on the driving shaft, a square sleeve on said gear, a clutch member mounted to slide longitudinally on said sleeve, a second pair of meshing gears adapted to freely rotate on the respective shafts, and means for connecting one or the other of said clutch members to a corresponding gear of the last mentioned pair of gears.

4. In a variable speed gear mechanism, the combination with a driving shaft, of a stationary shaft, a pair of gears adapted to freely rotate on the stationary shaft, a pair of gears meshing with the stationary gears and adapted to freely rotate on the driving shaft, means for operatively connecting one of said gears to the driving shaft, a sleeve on one of the gears of each pair of gears, a clutch member mounted to rotate with each sleeve and adapted to slide longitudinally thereon, and means for operatively connecting either one of said clutch members to the remaining gear on the corresponding shaft to thereby transmit power from one gear to the other gear on a shaft.

In testimony whereof I have hereunto set my hand.

LELAND F. GOODSPEED.

Witnesses:
GEORGE ELLESON,
FRANK D. SHELDON.